US008405615B1

(12) United States Patent
Williams

(10) Patent No.: US 8,405,615 B1
(45) Date of Patent: Mar. 26, 2013

(54) COMPUTER INPUT SYSTEM

(76) Inventor: Mark A. Williams, Bradenton, FL (US)

(*) Notice: Subject to any disclaimer, the term of this patent is extended or adjusted under 35 U.S.C. 154(b) by 437 days.

(21) Appl. No.: 12/583,103

(22) Filed: Aug. 14, 2009

Related U.S. Application Data

(60) Provisional application No. 61/170,639, filed on Apr. 19, 2009.

(51) Int. Cl.
*G06F 3/02* (2006.01)
(52) U.S. Cl. .................. 345/168; 361/679.14
(58) Field of Classification Search .............. 345/167, 345/168; 361/679.14
See application file for complete search history.

(56) References Cited

U.S. PATENT DOCUMENTS

| 6,005,496 A * | 12/1999 | Hargreaves et al. | 341/22 |
| 6,084,576 A * | 7/2000 | Leu et al. | 345/168 |
| 2006/0012574 A1* | 1/2006 | Kauk et al. | 345/169 |

* cited by examiner

*Primary Examiner* — Latanya Bibbins
(74) *Attorney, Agent, or Firm* — Stephen C. Thomas; Hayworth, Chaney & Thomas P.A.

(57) ABSTRACT

A pair of essentially similarly configured computer input controllers including a first controller and a second controller. Each of the controllers has a front, a rear, an intermediate section, an interior surface, an exterior surface, a top, and a bottom. A hand rest area is formed on the top of each of the controllers adjacent to the front. Each controller is at a lower elevation adjacent to the front and a higher elevation adjacent to the intermediate section. A track ball is rotationally supported in the interior surface adjacent to the intermediate section of the second controller. A keyboard portion is formed on the top of each of the controllers adjacent to the rear. A plurality of buttons is on the top of each of the controllers.

1 Claim, 3 Drawing Sheets

COMPUTER INPUT SYSTEM

RELATED APPLICATION

The present invention is based upon Provisional Patent Application No. 61/170,639 filed Apr. 19, 2009, the subject matter of which is incorporated herein by reference.

BACKGROUND OF THE INVENTION

1. Field of the Invention

The present invention relates to a computer input system and more particularly pertains to positioning operational components at strategic locations on two similarly configured halves in a convenient and economical manner.

2. Description of the Prior Art

The use of computer input systems of known designs and configurations is known in the prior art. More specifically, computer input systems of known designs and configurations previously devised and utilized for the purpose of inputting data are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a computer input system that allows for positioning operational components at strategic locations on two similarly configured halves in a convenient and economical manner.

In this respect, the computer input system according to the present invention substantially departs from the conventional concepts and designs of the prior art, and in doing so provides an apparatus primarily developed for the purpose of positioning operational components at strategic locations on two similarly configured halves in a convenient and economical manner.

Therefore, it can be appreciated that there exists a continuing need for a new and improved computer input system which can be used for positioning operational components at strategic locations on two similarly configured halves in a convenient and economical manner. In this regard, the present invention substantially fulfills this need.

SUMMARY OF THE INVENTION

In view of the foregoing disadvantages inherent in the known types of computer input systems of known designs and configurations now present in the prior art, the present invention provides an improved computer input system. As such, the general purpose of the present invention, which will be described subsequently in greater detail, is to provide a new and improved computer input system and method which has all the advantages of the prior art and none of the disadvantages.

To attain this, the present invention essentially comprises a pair of essentially similarly configured computer input controllers including a first controller and a second controller. Each of the pair of controllers has a front section, a rear section and an intermediate section. Each of the controllers has an interior surface and an exterior surface. Each of the controllers has a contoured top. Each of the controllers has a planar bottom positionable upon a planar recipient surface, not shown.

Next provided is a pair of hand rest areas formed on the top of one of the controllers adjacent to the front section. Each hand rest area is imperforate and in an oval configuration with a major axis extending from the front section to the rear section and with a minor axis extending from the interior surface to the exterior surface. The hand rest area of each controller is at a lower elevation adjacent to the front section and at a higher elevation adjacent to the intermediate section.

Next provided is a track ball rotationally supported in the interior surface adjacent to the intermediate section of the second controller adjacent to the intermediate section. Each track ball is adapted to be rotated for moving a cursor, not shown.

A keyboard portion is formed on the top of each of the controllers adjacent to each rear section. Each keyboard portion has a plurality of keys arranged in four rows of seven keys with distinct alpha-numeric indicia on each key. The keyboard portions of the pair of controllers, when taken together, constitute a full conventional keyboard.

Each hand rest area has an upper edge, a first row of buttons, and a second row of buttons. Each of the rows of buttons contains six buttons located between the intermediate section and the rear section of one of the controllers. The first row of buttons is located on an underside of the hand rest. The second row of buttons is located at an angle spaced beneath the first row of buttons.

Each controller has a two button array formed of two laterally spaced upwardly facing buttons adjacent to the interior surface at the intermediate section.

Each controller has a large upwardly facing button laterally spaced from the hand rest adjacent to the interior surface.

Each controller has a small upwardly facing button laterally spaced from the two button array adjacent to the exterior surface at the intermediate section.

Lastly, a four button array on the first controller including four upwardly facing spaced buttons in an oval pattern between the two button array and the large button adjacent to the interior surface at the intermediate section.

All of the buttons are programmable while macros are adapted to be assigned to individual buttons that emulate multiple key strokes with the ability to set time delays between key strokes assigned in a macro. The system is adapted to be connected via cable and wireless methods. In addition, software and device drivers are adapted to be added on an accompanying computer disk that includes functionality for the default keyboard layout and graphic user interface for managing custom profiles of button assignments.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved computer input system which has all of the advantages of the prior art computer input systems of known designs and configurations and none of the disadvantages.

It is another object of the present invention to provide a new and improved computer input system which may be easily and efficiently manufactured and marketed.

It is further object of the present invention to provide a new and improved computer input system which is of durable and reliable constructions.

An even further object of the present invention is to provide a new and improved computer input system which is susceptible of a low cost of manufacture with regard to both materials and labor, and which accordingly is then susceptible of low prices of sale to the consuming public, thereby making such computer input system economically available to the buying public.

Even still another object of the present invention is to provide a computer input system for positioning operational components at strategic locations on two similarly configured halves in a convenient and economical manner.

Lastly, it is an object of the present invention to provide a new and improved computer input system having a pair of essentially similarly configured computer input controllers including a first controller and a second controller. Each of the controllers has a front, a rear, an intermediate section, an interior surface, an exterior surface, a top, and a bottom. A hand rest area is formed on the top of each of the controllers adjacent to the front. Each controller is at a lower elevation adjacent to the front and a higher elevation adjacent to the intermediate section. A track ball is rotationally supported in the interior surface adjacent to the intermediate section of the second controller. A keyboard portion is formed on the top of each of the controllers adjacent to the rear. A plurality of buttons is on the top of each of the controllers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
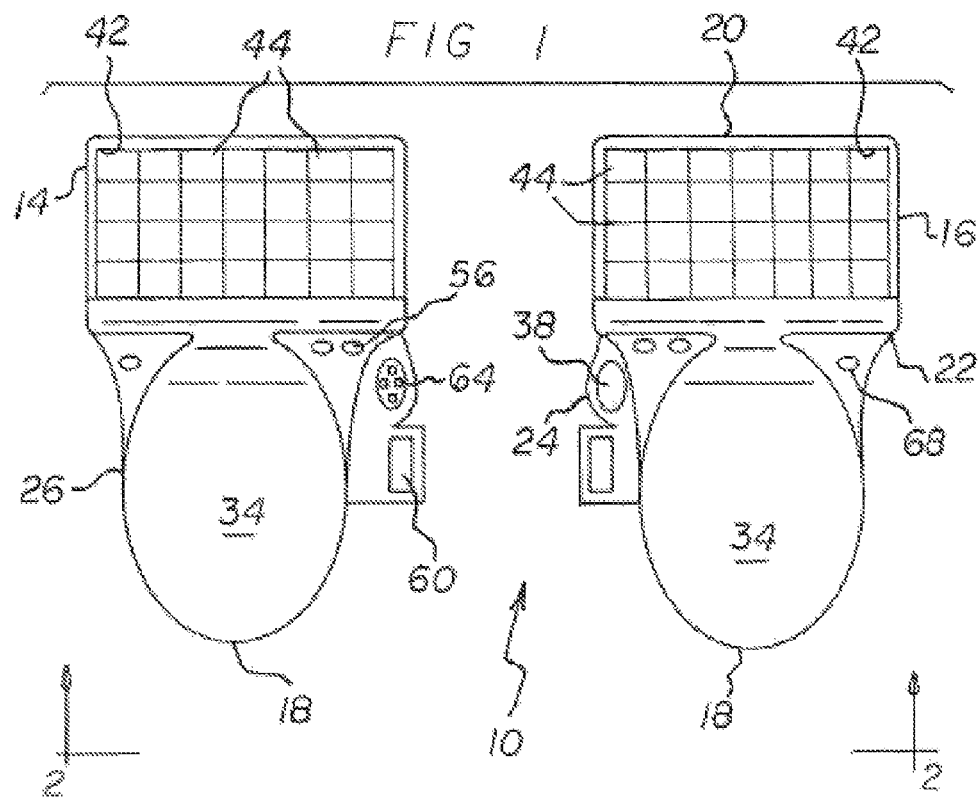
FIG. 1 is a plan view of a computer input system constructed in accordance with the principles of the present invention.
Figure 2:
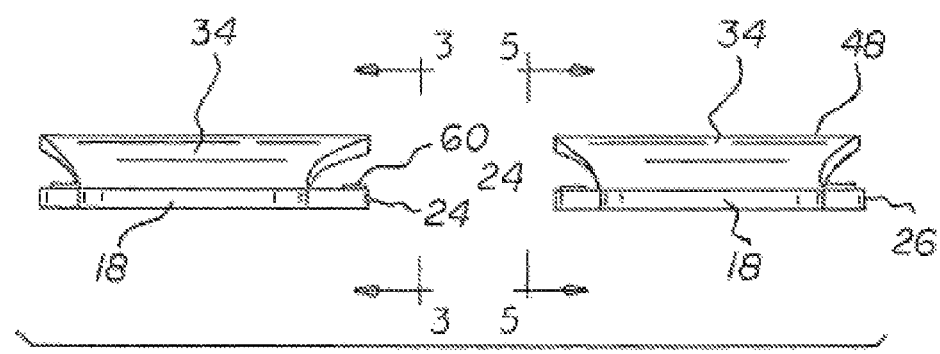
FIG. 2 is a front elevational view of the system taken along line 2-2 of FIG. 1.
Figure 3:
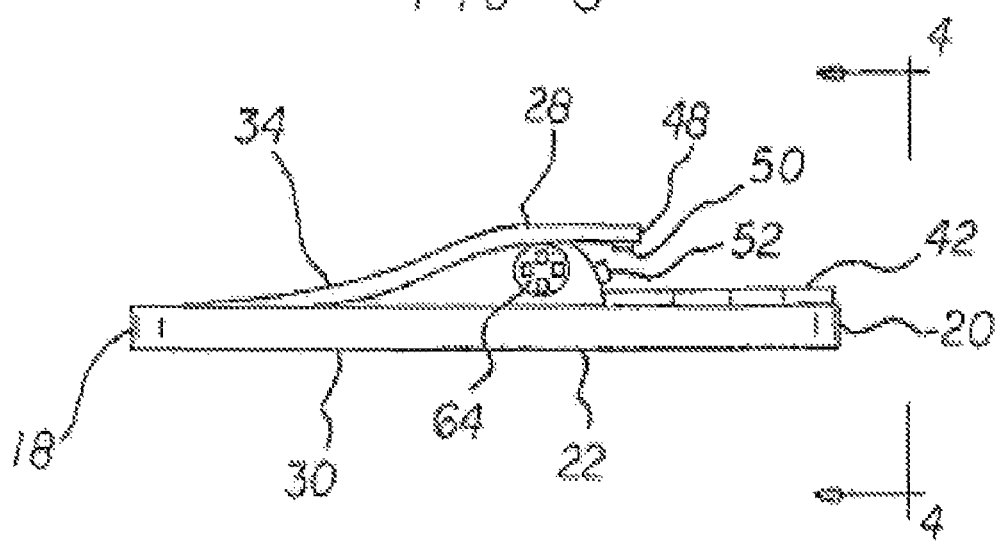
FIG. 3 is a side elevational view taken along line 3-3 of FIG. 2.
Figure 4:
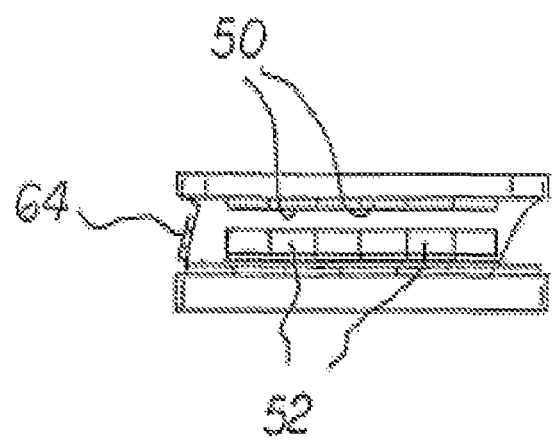
FIG. 4 is a rear elevational view taken along line 4-4 of FIG. 3.
Figure 5:
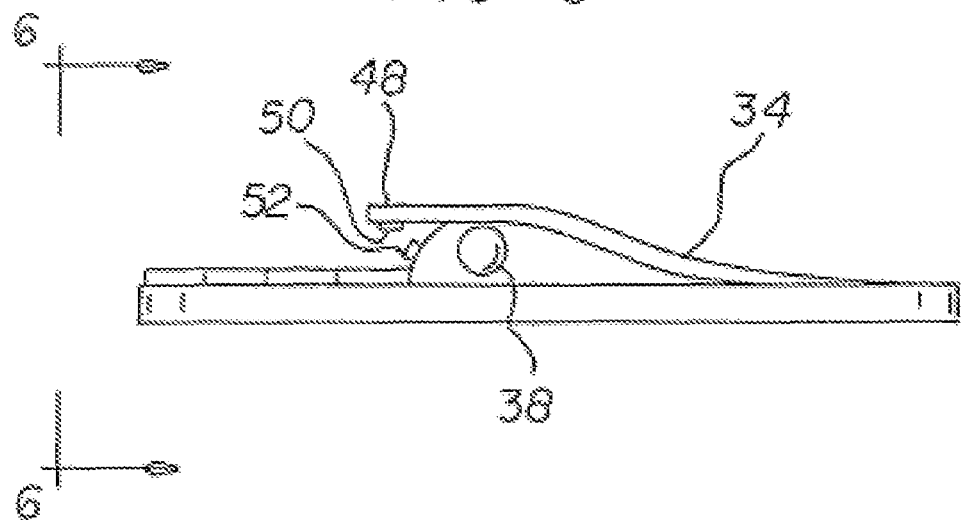
FIG. 5 is a side elevational view taken along line 5-5 of FIG. 2.
Figure 6:
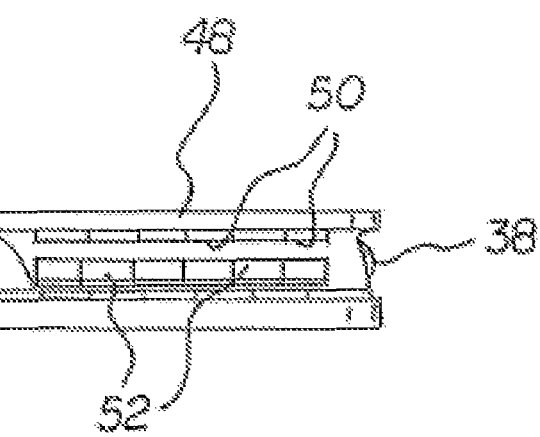
FIG. 6 is a rear elevational view taken along line 6-6 of FIG. 5.

With reference now to the drawings, and in particular to FIG. 1 thereof, the preferred embodiment of the new and improved COMPUTER INPUT SYSTEM embodying the principles and concepts of the present invention and generally designated by the reference numeral 10 will be described.

The present invention, the computer input system 10 is comprised of a plurality of components. Such components in their broadest context include a pair of similarly configured computer input controllers each having a hard rest area, a track ball, a keyboard portion and a plurality of buttons. Such components are individually configured and correlated with respect to each other so as to attain the desired objective.

The computer input system 10 of the present invention is for positioning operational components at strategic locations on two similarly configured halves. The positioning is in a convenient and economical manner. First provided are a pair of essentially similarly configured computer input controllers including a first controller 14 and a second controller 16. Each of the pair of controllers has a front section 18, a rear section 20 and an intermediate section 22. Each of the controllers has an interior surface 24 and an exterior surface 26. Each of the controllers has a contoured top 28. Each of the controllers has a planar bottom 30 positionable upon a planar recipient surface, not shown.

Next provided is a pair of hand rest areas 34 formed on the top of one of the controllers adjacent to the front section. Each hand rest area is imperforate and in an oval configuration with a major axis extending from the front section to the rear section and with a minor axis extending from the interior surface to the exterior surface. The hand rest area of each controller is at a lower elevation adjacent to the front section and at a higher elevation adjacent to the intermediate section.

Next provided is a track ball 38 rotationally supported in the interior surface adjacent to the intermediate section of the second controller adjacent to the intermediate section. Each track ball is adapted to be rotated for moving a cursor, not shown.

A keyboard portion 42 is formed on the top of each of the controllers adjacent to each rear section. Each keyboard portion has a plurality of keys 44 arranged in four rows of seven keys with distinct alpha-numeric indicia on each key. The keyboard portions of the pair of controllers, when taken together, constitute a full conventional keyboard.

Each hand rest area has an upper edge 48, a first row of buttons 50, and a second row of buttons 52. Each of the rows of buttons contains six buttons located between the intermediate section and the rear section of one of the controllers. The first row of buttons 50 is located on an underside of the hand rest. The second row of buttons 52 is located at an angle spaced beneath the first row of buttons.

Each controller has a two button array 56 formed of two laterally spaced upwardly facing buttons adjacent to the interior surface at the intermediate section.

Each controller has a large upwardly facing button 60 laterally spaced from the hand rest adjacent to the interior surface.

Each controller has a small upwardly facing button 68 laterally spaced from the two button array adjacent to the exterior surface at the intermediate section.

Lastly, a four button array 64 is provided on the first controller. The four button array includes four upwardly facing spaced buttons in an oval pattern between the two button array and the large button adjacent to the interior surface at the intermediate section.

The present invention is a split keyboard with integrated pointing devices that optimizes the button layout and structure. All of the buttons are programmable and macros may be assigned to individual buttons that emulate multiple key strokes with the ability to set time delays between key strokes assigned in a macro. The device is able to store multiple profiles of button assignments that can be quickly recalled and loaded for use via a profile-switching button. The device can be connected via cable or wireless methods. Software and device drivers may be added on an accompanying computer disk that includes functionality for the default keyboard layout and graphic user interface for managing custom profiles of button assignments.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A computer input system for positioning operational components at strategic locations on two similarly configured halves, the system comprising, in combination:

a pair of essentially similarly configured computer input controllers including a first controller and a second controller, wherein said first controller and said second controller are not physically joined to one another and wherein each of the pair of controllers having a front section and a rear section and an intermediate section, each of the controllers having an interior surface and an exterior surface, each of the controllers having a contoured top and a planar bottom positionable upon a planar recipient surface;

a pair of hand rest areas, each hand rest area formed on the top of one of the controllers adjacent to the front section, each hand rest area being imperforate and in an oval configuration with a major axis extending from the front section to the rear section and with a minor axis extending from the interior surface to the exterior surface, the hand rest area of each controller being at a lower elevation adjacent to the front section and at a higher elevation adjacent to the intermediate section;

a track ball rotationally supported in the interior surface adjacent to the intermediate section of the second controller adjacent to the intermediate section, the track ball adapted to be rotated for moving a cursor;

a keyboard portion formed on the top of each of the controllers adjacent to each rear section, each keyboard portion having a plurality of keys arranged in four rows, of seven keys with distinct alpha-numeric indicia on each key, the keyboard portions of the pair of controllers, when taken together, constituting a full conventional keyboard;

each hand rest area having an upper edge, a first, row of buttons, a second row of buttons, each of the rows of buttons containing six buttons located between the intermediate section and the rear section of one of the controllers, the first row of buttons being located on an underside of the hand rest facing downwardly, the second row of buttons being located at an angle spaced beneath the first row of buttons facing generally upwardly;

each controller having a two button array formed of two laterally spaced upwardly facing buttons adjacent to the interior surface at the intermediate section;

each controller having a large upwardly facing button laterally spaced from the hand rest adjacent to the interior surface;

each controller having a small upwardly facing button laterally spaced from the two button array adjacent to the exterior surface at the intermediate section;

a four button array on the first controller including four upwardly facing spaced buttons in an oval pattern between the two button array and the large button adjacent to the interior surface at the intermediate section; and wherein all of the buttons are programmable while macros are adapted to be assigned to individual buttons that emulate multiple key strokes with the ability to set time delays between key strokes assigned in a macro, and wherein the system is adapted to be connected via cable and wireless methods, and wherein software and device drivers are adapted to be added on an accompanying computer disk that includes functionality for the default keyboard layout and graphic user interface for managing custom profiles of button assignments.

* * * * *